United States Patent [19]

Kuroda et al.

[11] Patent Number: 5,642,420

[45] Date of Patent: Jun. 24, 1997

[54] CRYPTOINFORMATION REPEATER, SUBSCRIBER TERMINAL CONNECTED THERETO, AND CRYPTOCOMMUNICATION METHOD

[75] Inventors: Yasutsugu Kuroda, Kawasaki; Hiroaki Kikuchi, Sagamihara, both of Japan

[73] Assignee: Fujitsu Limited, Kawasaki, Japan

[21] Appl. No.: 358,721

[22] Filed: Dec. 19, 1994

[30] Foreign Application Priority Data

Mar. 3, 1994 [JP] Japan ................................ 6-033647

[51] Int. Cl.⁶ ...................................................... H04L 9/00
[52] U.S. Cl. ............................................................ 380/30
[58] Field of Search ....................................... 380/29, 30

[56] References Cited

U.S. PATENT DOCUMENTS

| | | | |
|---|---|---|---|
| 4,438,824 | 3/1984 | Mueller-Schloer | 380/30 |
| 4,458,109 | 7/1984 | Mueller-Schloer | 380/30 |
| 5,305,384 | 4/1994 | Ashby et al. | 380/29 |
| 5,416,842 | 5/1995 | Aziz | 380/30 |

FOREIGN PATENT DOCUMENTS 2 047 506  11/1990  United Kingdom.

*Primary Examiner*—Salvatore Cangialosi
*Attorney, Agent, or Firm*—Staas & Halsey

[57] ABSTRACT

A cryptographic information repeater installed in a system for transmitting information among a plurality of subscribers interconnected by a communication line. The repeater acts as a managing center for managing cryptokeys. Therefore, confidentiality can be effectively preserved because a common secret key is not shared by all the subscribers. When some subscriber withdraws or a new user enters, it is only necessary to update the database concentrated in the cryptographic information repeater. Therefore, if the number of subscribers increases, it will not be cumbersome to manage the data.

11 Claims, 10 Drawing Sheets

CRYPTOINFORMATION REPEATER, SUBSCRIBER TERMINAL CONNECTED THERETO, AND CRYPTOCOMMUNICATION METHOD

BACKGROUND OF THE INVENTION

In recent years, electronic mail, electronic bulletin boards, and so on have begun to be frequently used as means for exchanging and offering information under network environments.

In this kind of network, a system is built, based on an open architecture and so unauthorized access to electronic mail and leakage of confidential information to a third party have ever posed problems.

Furthermore, commercial services relying on the use of networks such as online shopping and home banking have been put into practical use. Under these circumstances, leakage of secret information to unauthorized persons might induce crimes.

In view of the foregoing, various cryptocommunication systems have been studied to enhance data security on networks. In particular, a sender encrypts data and transmits it over a network. A recipient deciphers the received encrypted data so as to restore it to its original format.

In multiaddress communication, information is transmitted from a single sender to a plurality of receivers. Cryptocommunication used in such multiaddress communication employs either common keys or private keys.

Where a common key is used., a common public key used for encipherment and a secret key used for decipherment are shared by all subscribers, i.e., senders and receivers. A sender encrypts information, using the public key common to all the subscribers, and transmits the encrypted information. A subscriber who receives this information decodes the encrypted information into plaintext that is in a plainly readable form, using the secret key common to all the subscribers.

Where private keys are employed, all the subscribers share a list of subscribers and a list of all private keys for their respective subscribers. When a sender transmits information to receivers, the sender encrypts the information with the public keys for the receivers, respectively. The receivers decrypt the codetext with their own secret keys so that the information is intelligible. These prior art techniques have the following problems.

Where a common key is utilized as described above, the secret key common to all the subscribers are managed by all of them and, therefore, it is highly likely that a third person gains acquaintance with the secret key. Hence, secrecy is liable to be breached. Furthermore, the possibility that a malicious subscriber deliberately makes use of the secret key in an illegal manner cannot be eliminated.

When a subscriber withdraws from this multiaddress communication system, a new secret key common to all the remaining subscribers must be created and distributed to them to prevent leakage of information. If the number of the subscribers of this multiaddress communication system increases, the management may be rendered more complex. In addition, an unexpected third party is able to transmit information to this multiaddress communication system, because the public key is made public. This may spoil the confinement of transmission of information among certain persons.

Where private keys are exploited as mentioned above, the following problems arise. The burden imposed on the storage portion of an encryption device for each subscriber may be increased unless each individual subscriber manages a list of all subscribers and the public keys. When a new user participates in the multiaddress communication system or some subscriber withdraws from this system, such information about the public keys for the subscribers which is held by the remaining subscribers must be updated. In this way, where the number of subscribers of the multiaddress communication system increases or decreases, it will become very cumbersome to manage and maintain the system.

Moreover, where the subscribers are distributed remotely, it takes a long time to transmit updated information. As a result, the contents of the information will become different among remaining subscribers. This would make it difficult to run the system smoothly.

SUMMARY OF THE INVENTION

In view of the foregoing problems, the present invention has been made.

It is an object of the present invention to provide a multiaddress cryptocommunication system in which the amount of secret information required to be managed by each subscriber is reduced to a minimum and which can flexibly cope with participation and withdrawal of subscribers.

The present invention resides in a system for transmitting information among plural subscribers interconnected by a communication network. In one feature of the invention, a cryptoinformation repeater is installed in this system, the repeater comprising a cryptographic computational measns for deciphering cryptoinformation received from an originator or enciphering information to be transmitted to receiving subscribers and a key storage means. A common secret key used for the decipherment and public keys for individual subscribers are stored in the key storage means. The public keys are used for decipherments for the respective subscribers.

In this feature of the present invention, the crypro- information repeater which is installed in the system acts as a managing center that manages the cryptokeys. Consequently, confidentiality can be effectively maintained, because the common secret key is not shared by all the subscribers. Where a newcomer enters or some subscriber withdraws, it is only necessary to update the database concentrated in this cryptoinformation repeater. Hence, even if the number of subscribers increases, the management is not made more complex. Other objects and features of the invention will become apparent from the description thereof, which follows.

DESCRIPTION OF THE PREFERRED EMBODIMENTS

Before describing the preferred embodiments of the present invention, specific examples of the prior art common key encryption system and of the prior art private key encryption system are described in detail.

Common Key Encryption System

Figure 9:
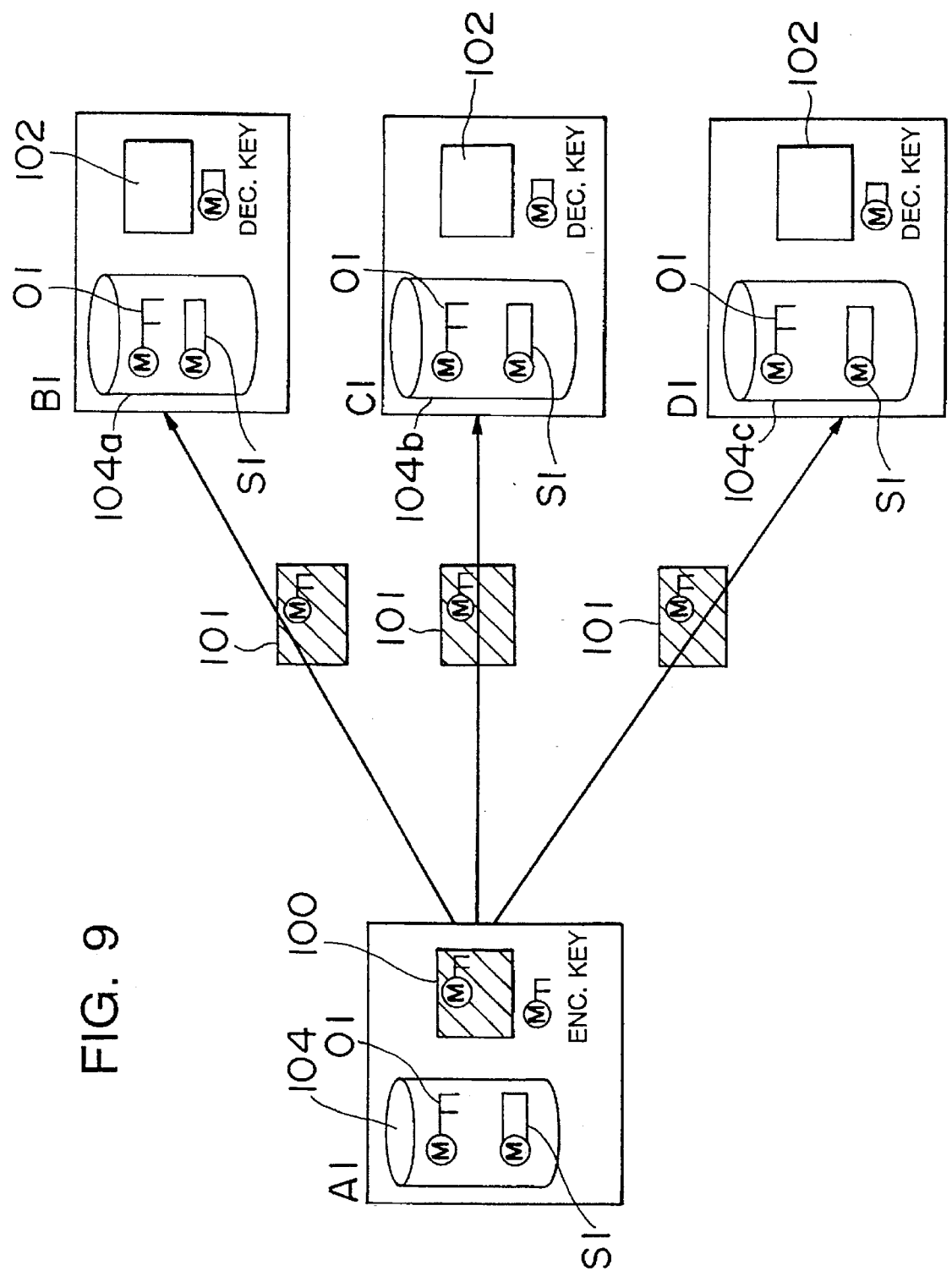
FIG. 9 is a block diagram illustrating a common key encryption system.

FIG. 9 shows a multiaddress communication system in which a sending subscriber (encryption device A1) transmits information to plural receiving subscribers (encryption devices B1, C1, and D1). A public key 01 and a secret key S1 both of which are common to all the subscribers are stored in a storage portion 104 that is incorporated in the sending encryption device A1. First, the encryption device A1 encrypts information 100 with the public key 01 and sends it as encrypted information 101 to the plural receiving subscribers. The encryption devices B1, C1, and D1 of these receiving users are equipped with storage devices 104a, 104b, and 104c, respectively. The secret key S1 is stored in all of these storage devices 104a, 104b, and 104c. The encryption devices B1, C1, and D1 decrypt the cryproinformation 101 into plaintext 102, using the secret key S1 stored in the storage devices 104a, 104b, 104c. The plaintext referred to herein means information which can be plainly read by a human or a machine.

In this method, the secret key S1 common to all the subscribers is managed by all of them and, therefore, it is highly likely that a third party gains acquaintance with the secret key, as mentioned previously. Hence, secrecy is readily breached. Furthermore, the possibility that a malicious subscriber deliberately utilizes the secret key illegally cannot be exhausted.

In addition, when a subscriber withdraws from this multiaddress communication system, a new secret key common to all the remaining subscribers must be created and distributed to them to prevent leakage of information. If the number of the subscribers of this communication system increases, the management may be made more complex. Further, an unexpected third party can transmit information to this multiaddress communication system, because the public key is made available to anyone. This may spoil the confinement of transmission of information among certain users.

Private Key Encryption System

Figure 10:
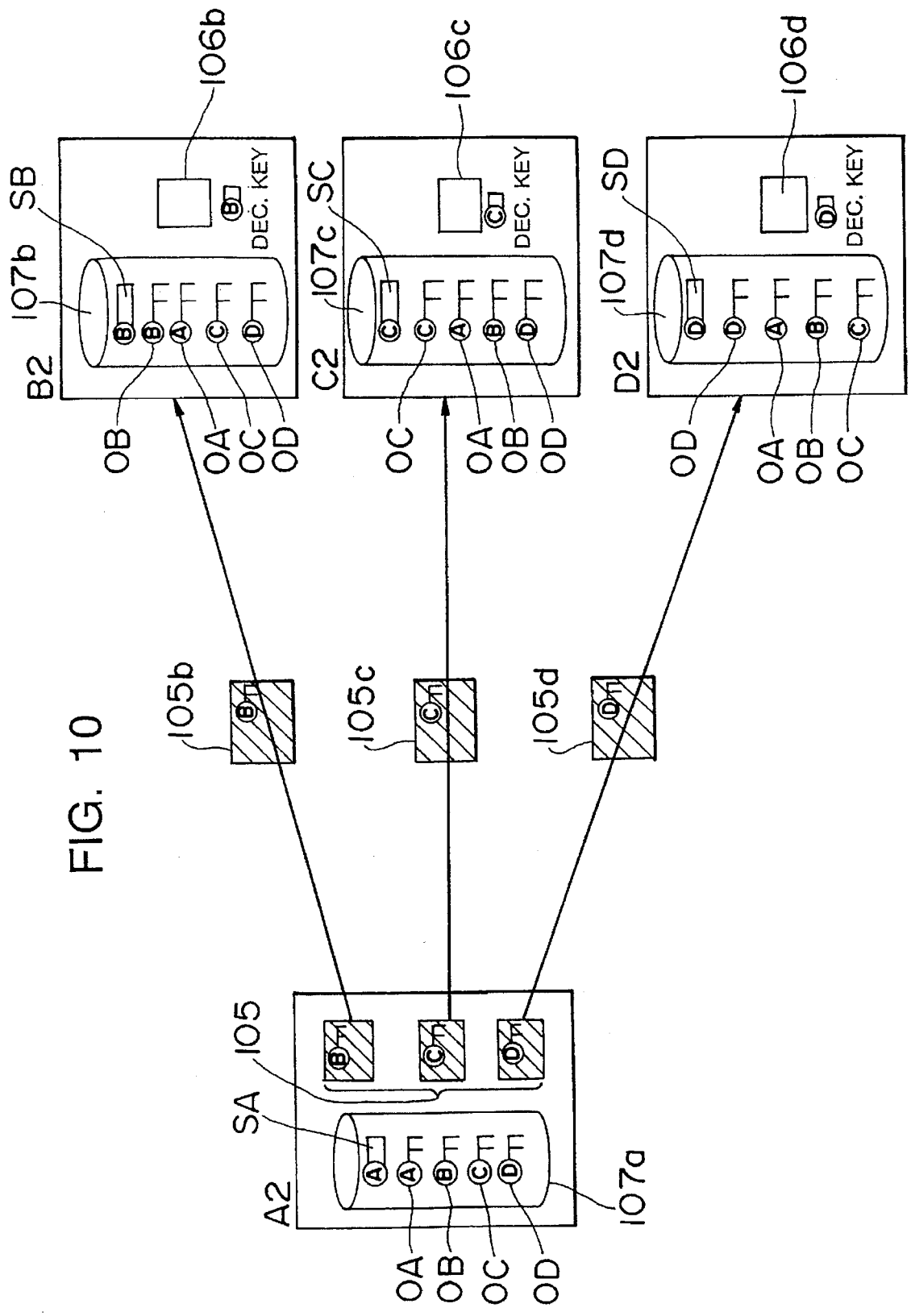
FIG. 10 is a block diagram illustrating a private key encryption system.

As shown in FIG. 10, a storage device 107a incorporated in a sending subscriber terminal holds public keys OA, OB, OC, and OD for the subscribers, respectively, together with a secret key SA that is used to decrypt the cryptoinformation received by this sending subscriber. All of these public keys OA–OD for the subscribers, respectively, are held also in storage devices 107b, 107c, and 107d, incorporated in the encryption devices B2, C2, and D2, respectively, of the receiving subscribers. Secret keys SB, SC, and SD for the receiving subscribers, respectively, are held in the storage portions 107b, 107c, 107d, respectively, of the encryption devices of the receiving subscribers.

It is assumed that information 105 is sent from one subscriber A2 to other subscribers (B2, C2, D2). First, the subscriber A2 creates encrypted information, or crypoinformation 105b, using the public key OB for the subscriber B2. Similarly, the subscriber A2 creates cryptoinformation 105c and cryptoinformation 105d, using the public keys OC and OD, respectively, for the subscribers C2 and D2, respectively. Then, these different pieces of information are sent to the subscribers B2, C2, D2, respectively.

The subscribers B2, C2, and D2 receive their respective pieces of cryptoinformation and decipher them into plaintexts 106b, 106c, 106d, respectively, using their respective secret keys SB, SC, SD.

Also in this cryptosystem, the burden imposed on the storage portion of the encryption device for each subscriber may be increased unless each individual subscriber manages a list of all subscribers and the public keys, as described above.

When a new person participates in the multiaddress communication system or some subscriber withdraws from this system, such information about the public keys for all the subscribers which is held by the remaining subscribers must be updated. In this way, where the number of subscribers of the multiaddress communication system increases or decreases, it will become very cumbersome to manage and maintain the system.

Moreover, where the subscribers are distributed among remote locations, it takes a long time to transmit updated information. As a result, the contents of information will become different among remaining subscribers. This would make it difficult to run the system smoothly.

Figure 1:
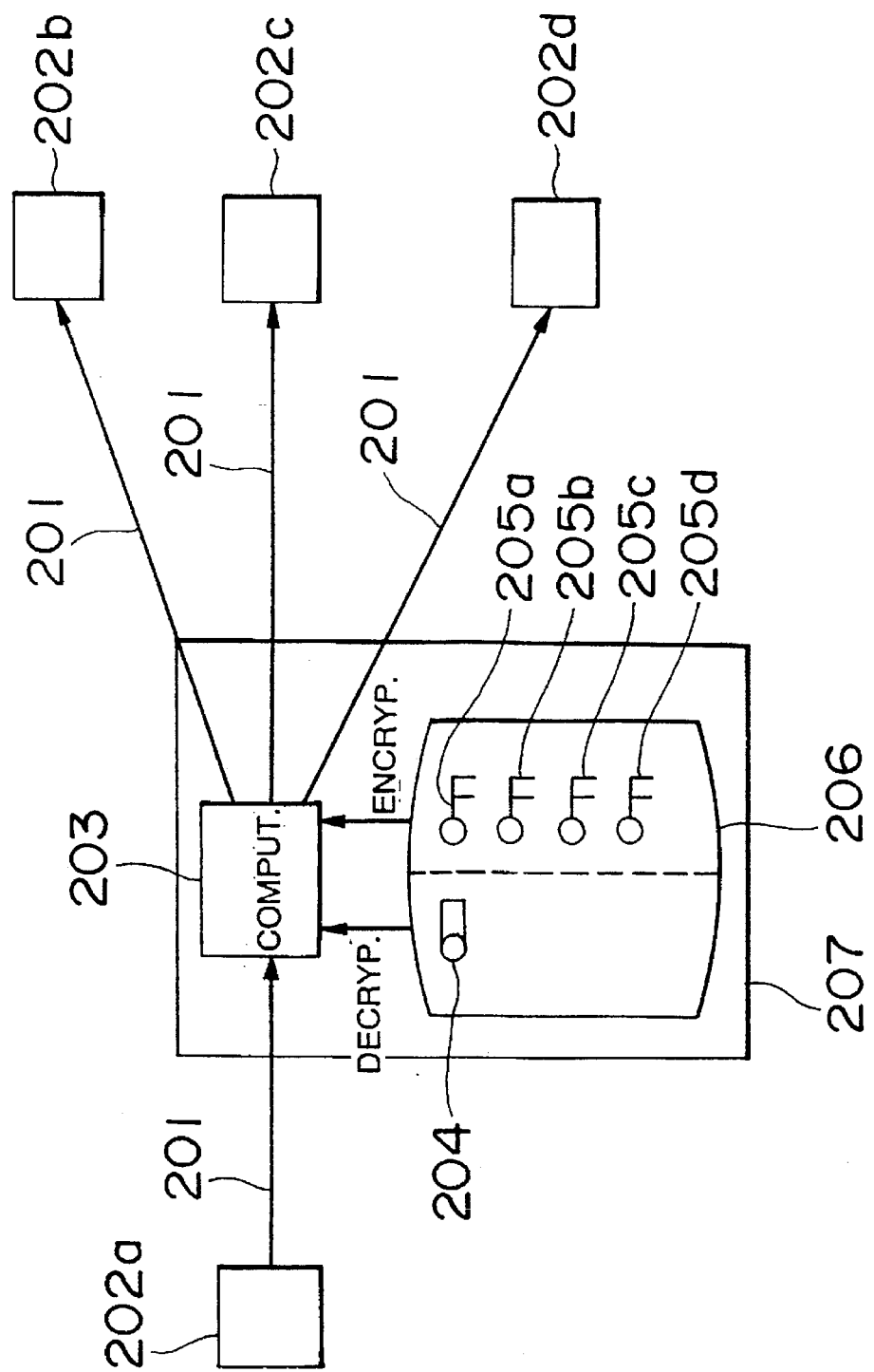
FIG. 1 is a diagram of a communication system equipped with a cryptoinformation repeater according to the present invention, illustrating the principle of the invention.

The principle of the present invention made in view of the foregoing is illustrated in FIG. 1. A plurality of subscribers 202a, 202b, 202c, and 202d are interconnected by a communication line 201. Information is transmitted among these subscribers in this system. This system comprises a cryptoinformation repeater 207 which is composed of a cryptographic computational portion 203 and a key storage portion 206. The cryptographic computational portion 203 deciphers cryptoinformation received from the sending subscriber 202a or encrypts information to be sent to the receiving subscribers. A common secret key 204 and public keys 205a, 205b, 205c, 205d are stored in the key storage portion 206. The common secret key 204 is used for the decipherment. The public keys 205a, 205b, 205c, 205d for the subscribers, respectively, are used for encryptions for the subscribers, respectively.

The cryptoinformation repeater installed in this way acts as a managing center for the cryptokeys. In consequence, confidentiality can be effectively maintained because the common secret key is not shared by all the subscribers. Where a newcomer enters or some subscriber withdraws, it is only necessary to update the database concentrated in this cryptoinformation repeater. Hence, even if the number of subscribers increases, the management is not made more complex.

Four specific examples of the invention are described below.

EXAMPLE 1

Figure 2:
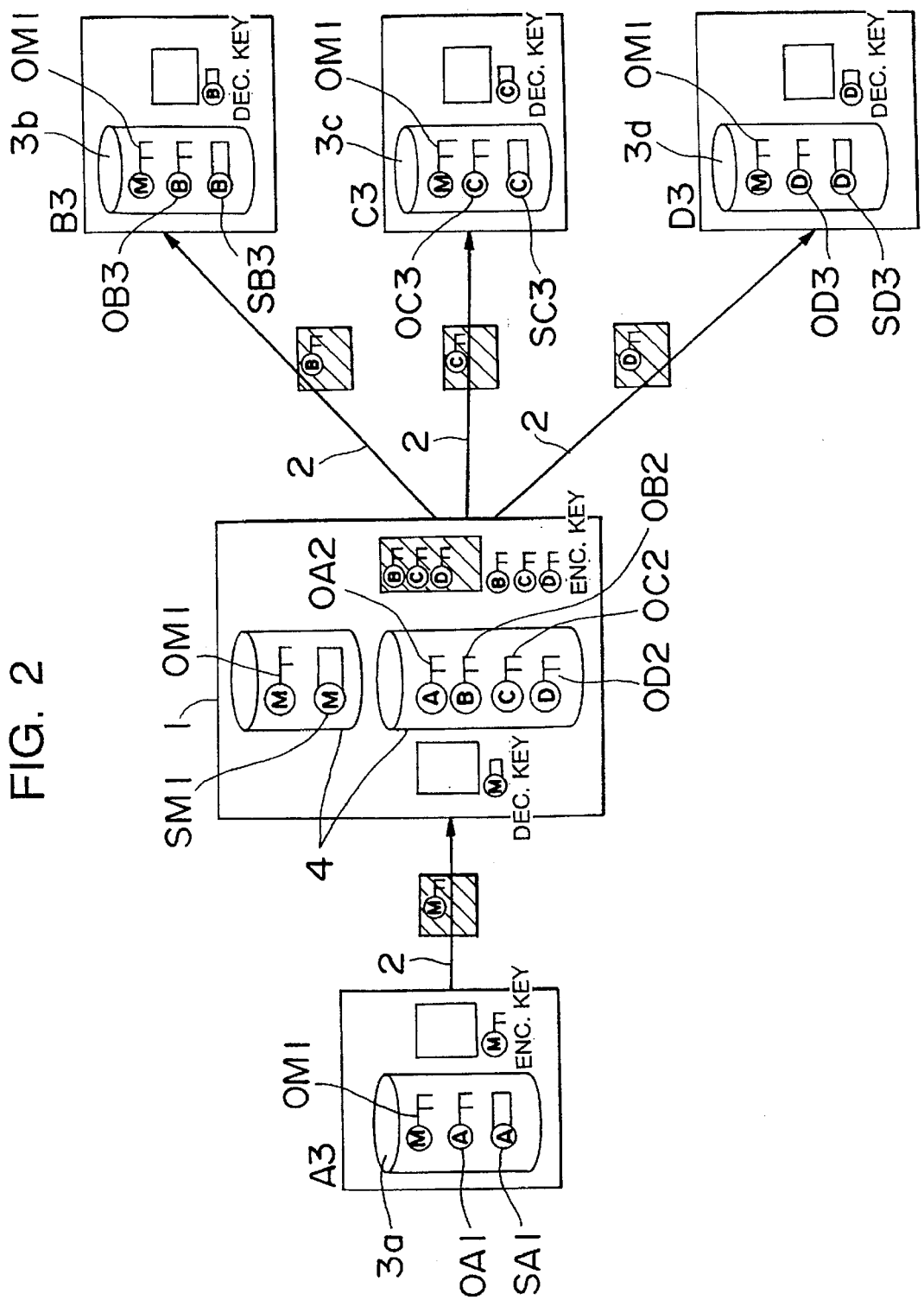
FIG. 2 is a block diagram showing the system structure of Example 1 of the invention.

Referring to FIG. 2, there is shown the structure of a system according to Example 1 of the present invention. In the present example, PEM (privacy enhanced mail) is used as a cryptocommunication means. The PEM is a standard form of cryptographic electronic mail stipulated in standardized documents rfc1421–1242 of Internet Protocol. Information is encrypted with secret cryptographic key DES, and this key is enciphered with public cipher RSA (described later) and transmitted.

In FIG. 2, a cryptoinformation repeater, indicated by reference numeral 1, is connected with subscriber terminals A3, B3, and C3 by a communication line 2. In the present example, it is assumed for convenience that cryptoinformation is routed from the subscriber A3, or its terminal A3, to three subscribers B3, C3, and D3, or their respective terminals B3, C3, and D3. Obviously, in actual cryptocommunication environment, it is necessary that the cryptoinformation be transmitted to more subscribers by multiaddress communication.

The subscriber terminals A3, B3, C3, and D3 are equipped with key storage portions $3a$, $3b$, $3c$, and $3d$, respectively. A common public key OM1, a public key OA1 for the terminal A3, and a secret key SA1 for the terminal A3 are registered in the key storage portion $3a$ of the terminal A3. Similarly, the common public key OM1, a public key OB3 for the terminal B3, and a secret key SB3 for the terminal B3 are registered in the key storage portion $3b$ of the terminal B3. The common public key OM1, a public key OC3 for the subscriber C3, and a secret key SC3 for the subscriber C3 are registered in the key storage portion $3c$ of the terminal C3. The common public key OM1, a public key OD3 for the subscriber D3, and a secret key SD3 for the subscriber D3 are registered in the key storage portion $3d$ of the terminal D3.

The cryptoinformation repeater 1 has a key storage portion 4 in which the common public key OM1, a common secret key SM1, and public keys OA2, OB2, OC2, and OD2 for the subscribers, respectively, are registered.

The public keys are used to encrypt information. The secret keys are employed to decrypt encrypted information. The RSA (Rivest-Shamir-Adelman) algorithm is known as a crypto-graphic algorithm using such public keys and secret keys. This RSA algorithm is now described briefly. The mathematical theory of the RSA method is that "i which is relatively prime to n is multiplied by $\Phi^{(n)}$ to thereby result in a first product and the first product is multiplied by mod n to give rise to a product of 1". This is given by $$i\Phi^{(n)}(mod\ n)=1 \qquad (1)$$

It is assumed that e and d are random integers which are reciprocals of the mod $\Phi$ (n). That is, $$e\ d=1/(mod\Phi(n)) \qquad (2)$$

According to Euler's theorem, if M is relatively prime to n, the following two relations hold:

$$(M^e)^d=M(mod\ n)$$
$$(M^d)^e=M(mod\ n) \qquad (3)$$

This is applied to cryptography. If M is a part of a message or information, the message can be encoded by the following function:

$$s=M^e(mod\ n) \qquad (4)$$

On the other hand, when decryption is made, the function assumes the following form:

$$M=s^d(mod\ n) \qquad (5)$$

Then, the Euler's phi function $\Phi$ (pq) is calculated. Let n be the product of two prime numbers. Thus, we have $$\Phi(pq)=(p-1)\ (q-1)=\Phi(n)$$

Then, a value e which is relatively prime to $\Phi$ (n) is selected. Preferably the value e satisfies the relations given by $$max\ (p+1,q+1)<e<\Phi(n)$$

Furthermore, a value d which satisfies the following equation is selected:

$$(e\ d)=1(mod\Phi(n))$$

That is, the reciprocal of the value e is selected to modulus $\Phi$ (n). If the value d is too small, i.e., less than $\log_2 n$, then the values e and d are varied.

In order to encrypt a message m, it is divided into integers M of fixed size smaller than n. With respect to each portion of the message, the following value is computed:

$$(M^e)\ (mod\ n)=s$$

This will become a public key. In the present example, this is calculated by a cryptographic computational portion 6 (described later). These values are connected to create cryptographic information, or cryptoinformation. The connecting processing may be performed by an information-creating portion 7.

To decrypt this message, or the cryptoinformation, the message is divided into blocks. Each block is decoded with $$(s^d)\ (mod\ n)=M$$

This will become a secrete key.

Figure 3:
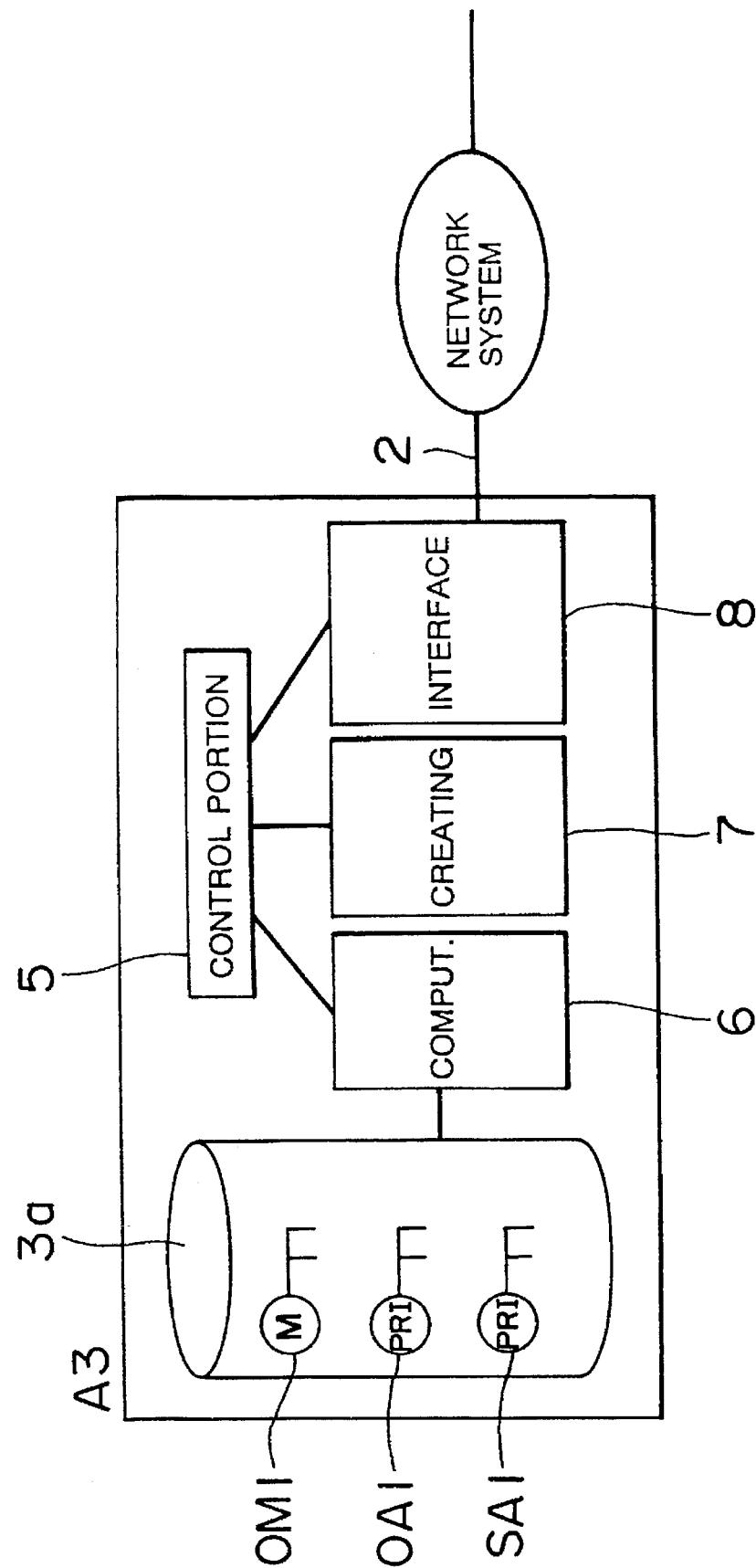
FIG. 3 is a block diagram showing the internal structure of one subscriber terminal of Example 1.

The internal structure of one subscriber terminal A3 is more particularly shown in FIG. 3. The aforementioned crypto-graphic computational portion 6 gains access to the key storage portion $3a$ in which the common public key OM1, the public key OA1 for the terminal A3, and the secret key SA1 for the terminal A3 are stored. The information-creating portion 7 is equipped with an editor for creating document. A communication interface 8 executes a procedure for communication with the communication line 2. These cryptographic computational portion 6, information-creating portion 7, and communication interface 8 are under the control of a control portion 5. In a more specific example, these portions are realized by the use of a computer system. The key storage portion $3a$ is created on a magnetic recording medium. The cryptographic computational portion 6 is implemented by given logics performed by a processor included in the control portion.

Figure 4:
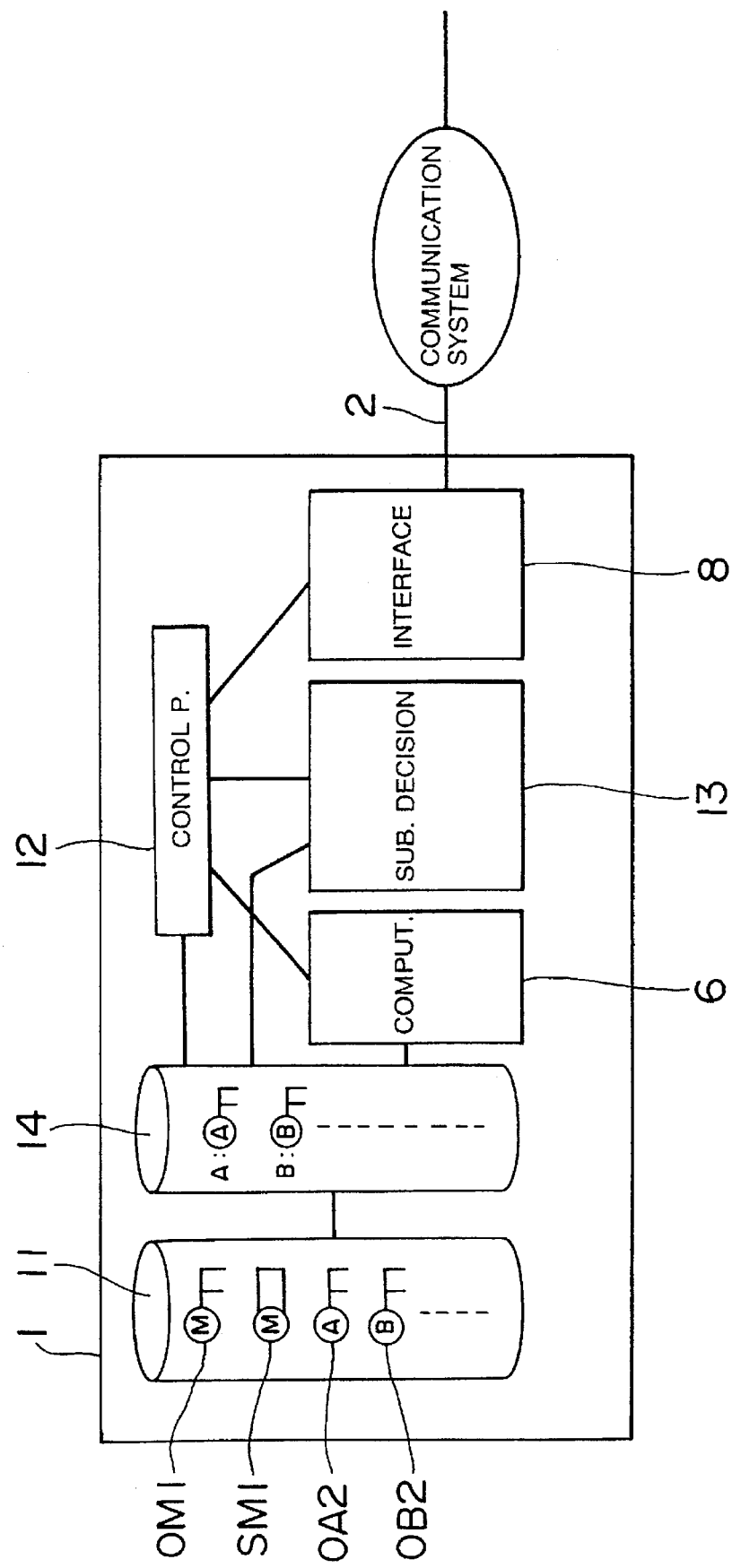
FIG. 4 is a block diagram showing the internal structure of a cryptoinformation repeater included in Example 1.

FIG. 4 more particularly shows the internal structure of the cryptoinformation repeater 1 in the present example. The common public key OM1, the common secret key SM1 corresponding to the public key OM1, and the subscriber's public keys OA2, OB2, etc. are stored in a key storage portion 11.

This key storage portion 11 has a subscriber information storage portion 14 acting as an index. Information about the subscribers and the subscriber's public keys correlated to the information are registered in the storage portion 14. An administrative operator for this cryptoinformation communication system can modify, erase, or add this subscriber information storage portion 14 through a control portion 12 to update the key storage portion 11.

The key storage portion 11 is accessed by the cryptographic computational portion 6 so that the secret keys and public keys are read from this storage portion 11.

A subscriber decision portion 13 analyzes digital signatures appended to information sent from a sending terminal and makes a decision as to whether this sending terminal is an authorized subscriber.

The communication interface 8 executes the procedure for communication with the communication line 2, as described previously.

These cryptographic computational portion 6, subscriber decision portion 13, and communication interface 8 are controlled by the control portion 12. In a more specific example, these portions are realized by the use of a computer system. The key storage portion 11 and the subscriber information storage portion 14 are created on a magnetic recording medium. The functions of the cryptographic computational portion 6 are performed by given logics which are executed by a processor included in the control portion 12.

A situation in which encrypted information is distributed from the subscriber terminal A3 to the terminals B3, C3, and D3 via the cryptoinformation repeater 1 is now described by referring to these FIGS. 2–4.

The sending subscriber terminal A3 first enciphers information, using the common public key OM1 to create cryptoinformation and sends it over the communication line 2.

The cryptoinformation repeater 1 receives this cryptoinformation and decrypts it into plaintext, using the secrete key SM1, the plaintext being plainly readable by a human or a machine.

Then, the cryptoinformation repeater 1 again encrypts the plaintext, using the public key OB2 for the subscriber terminal B3. The information recoded in this way is transmitted over the communication line 2. The subscriber terminal B3 receives this recoded information and decrypts it into plaintext, using its own secret key SB3.

During this recoding operation, the cryptoinformation repeater 1 again encrypts the information through the use of the public keys OC2 and OD2 and sends the information to the subscriber terminals C3 and D3. The terminals C3 and D3 receive the information and recodes it into plaintext, using their own secret keys SC3 and SD3, respectively.

In this way, in the present example, all information regarding the public keys for the subscribers is managed by the cryptoinformation repeater 1. Each individual subscriber manages only a combination of the common public key OM1, its own public key, and its own secret key. Accordingly, each subscriber is not required to manage the secret key common to all the subscribers. When a new user enters or some subscriber withdraws, it is only necessary to rewrite the data held in the cryptoinformation repeater 1. Consequently, the system can quickly cope with such participation and withdrawal of users only by the administrative operator. Therefore, where some subscriber withdraws or a new user enters, it is not necessary for the remaining subscribers to reset public keys and secret keys common to all the subscribers.

EXAMPLE 2

Figure 5:
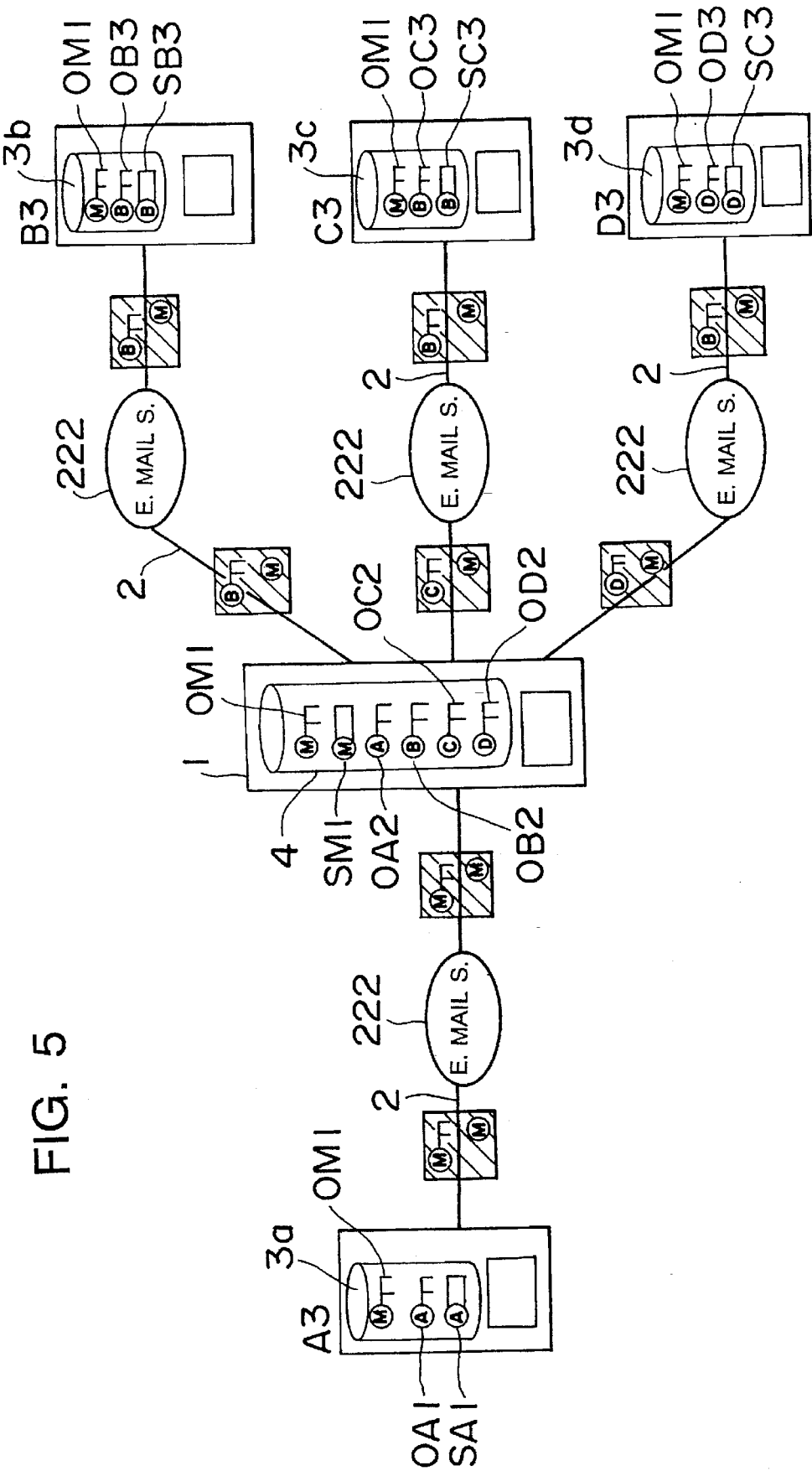
FIG. 5 is a block diagram showing the system structure of Example 2 of the invention.

FIG. 5 is a block diagram showing the structure of a system according to Example 2 of the present invention. This system according to Example 2 is similar to the system structure of Example 1 described above except that digital signatures are attached to cryptoinformation.

A situation in which encrypted information is distributed from the sending subscriber terminal A3 to the receiving subscriber terminals B3, C3, and D3 via the cryptoinformation repeater 1 in the present example is now described.

The sending subscriber terminal A3 creates information by means of its information-creating portion 7 (FIG. 3). Then, the cryptoinformation computational portion 6 encrypts the information, using the public key OM1 common to all the subscribers. Then, the cryptographic computational portion 6 of this sending terminal writes a digital signature to the crypto information, using its own secret key SA1.

The cryptoinformation and digital signature created in this way are transmitted over the communication line 2 via the communication interface 8. At this time, the sending terminal A3 specifies the addresses of receivers which should receive the information sent by multiaddress electronic mail.

An electronic mail system 222 sends the cryptoinformation and digital signature to the cryptoinformation repeater 1 according to the specified addresses of mail.

When the cryptoinformation repeater 1 receives the cryptoinformation and digital signature through the communication interface 8, the cryptographic computational portion 6 decodes the cryptoinformation into plaintext, using the secret key SM1 common to all the subscribers, under the control of the control portion 12. Then, the digital signature is checked. In particular, the authenticity of the digital signature can be confirmed by using the public key OA2 for the sending subscriber, the public key OA2 being registered in the key storage portion 11.

Then, the subscriber decision portion 13 makes a decision as to whether the sender is an authentic subscriber, using the sender's electronic mail address, while referring to the subscriber information storage portion 14. The cryptographic computational portion 6 writes a digital signature to the information with the secret key SM1 common to all the subscribers under the control of the control portion 12. Thereafter, the cryptographic computational portion 6 encrypts the information with the public keys for the respective subscribers to create cryptoinformation under the control of the control portion 12. For example, if the information should be sent to the subscriber terminal B3, the information is encrypted, using the public key OB2. If the information should be sent to the subscriber terminal C3, the information is encoded, using the public key 0C3.

Then, the cryptoinformation repeater 1 transmits the recoded information and the digital signature to the electronic mail system 222 via the communication interface 8. The mail system 222 sends the cryptoinformation and the digital signature to the subscribers according to their mail addresses. The subscriber (e.g., the subscriber terminal B3) receiving the cryptoinformation and the digital signature decrypts the cryptoinformation, using its own secrete key (e.g., SB3), by means of the cryptographic computational portion 6 through its own control portion 5.

The receiving subscriber terminal B3 checks the digital signature, using the public key OM1 common to all the subscribers, by means of the cryptographic computational portion 6.

In this way, in the present example, the sending user can authenticate its identity by the use of a digital signature. Furthermore, the cryptoinformation repeater 1 can prevent a third party from pretending to be a subscriber. That is, it is easy for each receiving subscriber to check if the sender is an authorized user, i.e., if a third party is pretending to be the cryptoinformation repeater 1, by checking the digital signature.

EXAMPLE 3

Figure 6:
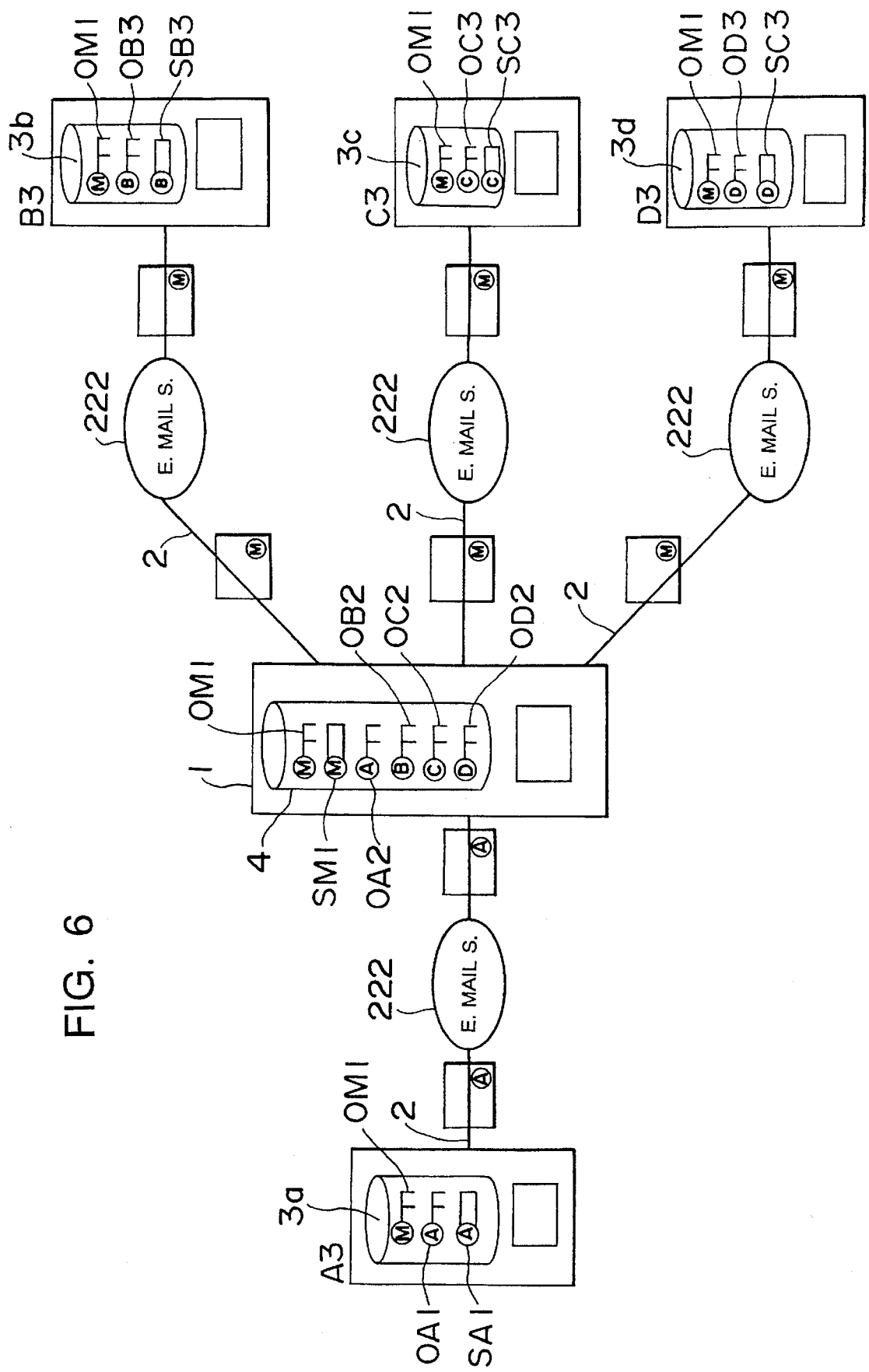
FIG. 6 is a block diagram showing the system structure of Example 3 of the invention.

FIG. 6 is a block diagram showing the structure of a system according to Example 3 of the present invention. The system structure of Example 3 is similar to the system structure of Example 2 already described in conjunction with FIG. 5 except that plaintext is transmitted only with a digital signature without using encryption.

A situation in which encrypted information is distributed from the sending subscriber terminal A3 to the receiving subscriber terminals B3, C3, and D3 via the cryptoinformation repeater 1 in the present example is now described. The subscriber terminals and the cryptoinformation repeater 1 are similar in structure to their counterparts described previously in connection with FIGS. 3 and 4.

The sending subscriber terminal A3 creates information to be sent by means of the control information-creating portion 7 which is controlled by the control portion 5. Then, the cryptoinformation computational portion 6 writes a digital signature to this information by the use of the secret key SA1 for the sending subscriber under the control of the control portion 5. The sending terminal transmits the information and the digital signature to the electronic mail system 222 via the communication interface 8. The mail system 222 routes the information and the digital signature to the cryptoinformation repeater 1 according to the electronic mail address.

The cryptoinformation repeater 1 receiving the information and the digital signature verifies the digital signature through the cryptographic computational portion 6. The subscriber decision portion 13 makes a decision as to whether the sender is an authentic subscriber, based on the sender's electronic mail address, while referring to the subscriber information storage portion 14.

Then, the cryptoinformation computational portion 6 writes a digital signature to the information by the use of the secret key SM1 common to all the subscribers under the control of the control portion 12. The control portion 12 sends the information and digital signature obtained in this way to the electronic mail system 222 via the communication interface 8.

The subscriber terminal (e.g., B3) receiving the information and digital signature via the electronic mail system 222 checks the digital signature, using the public key OM1 common to all the subscribers, through the cryptographic computational portion 6 of this terminal B3.

In this manner, in the present example, even if information is transmitted in the form of plaintext without encrypting the information, the use of the digital signature authenticates the identity of the sending terminal. Thus, it is easy for each receiving subscriber to check if the sender is an authorized user, by checking the digital signature. In consequence, if the sender is an unauthorized party, the receiver can reject unwanted information before reading it.

EXAMPLE 4

Figure 7:
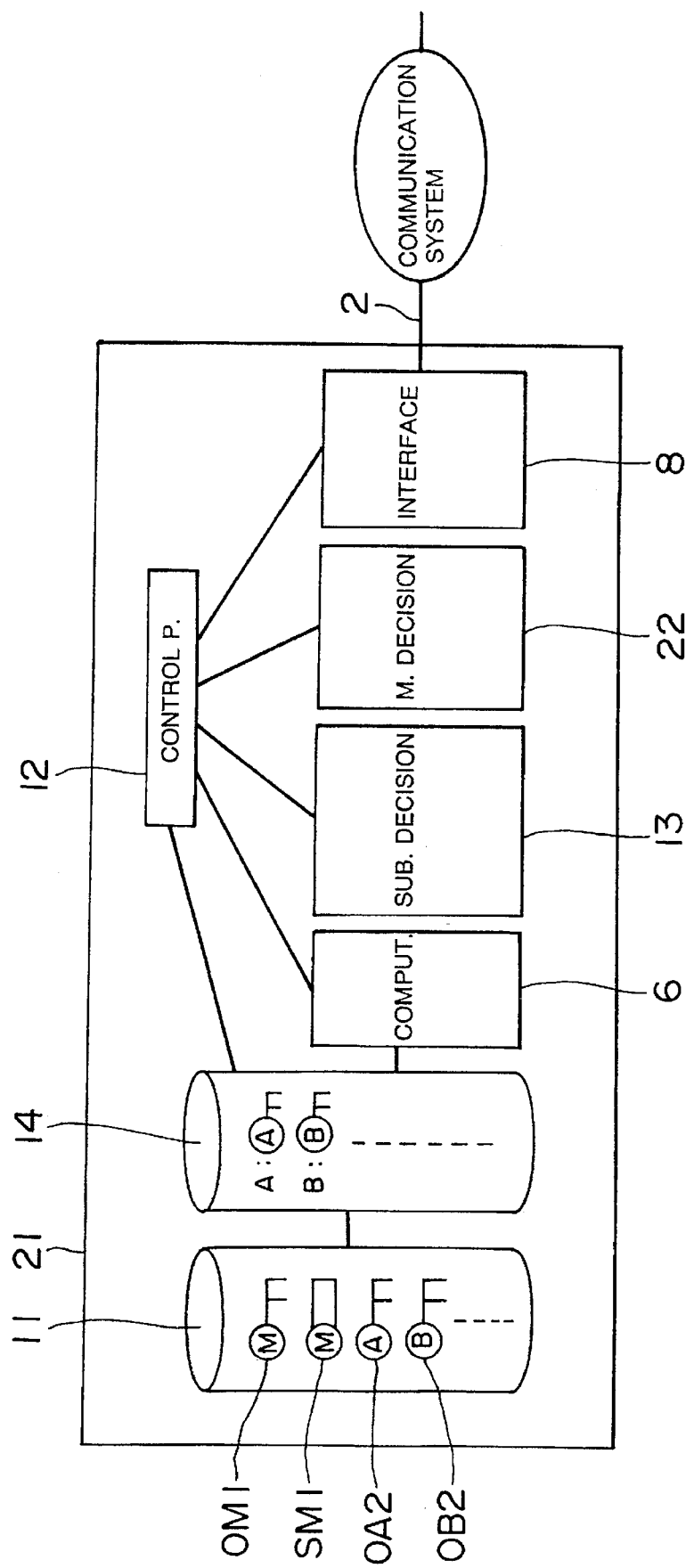
FIG. 7 is a block diagram of a cryptoinformation repeater 21 included in Example 4 of the invention.

FIG. 7 shows a cryptoinformation repeater according to Example 4 of the present invention. This repeater, generally indicated by reference numeral 21, is similar in structure to the cryptoinformation repeater 1 of Example 1 already described except that a multiaddress decision portion 22 is added. Since the whole system structure is similar to the structure shown in FIG. 2, the following description is given again with reference to FIG. 2 for convenience.

Figure 8:
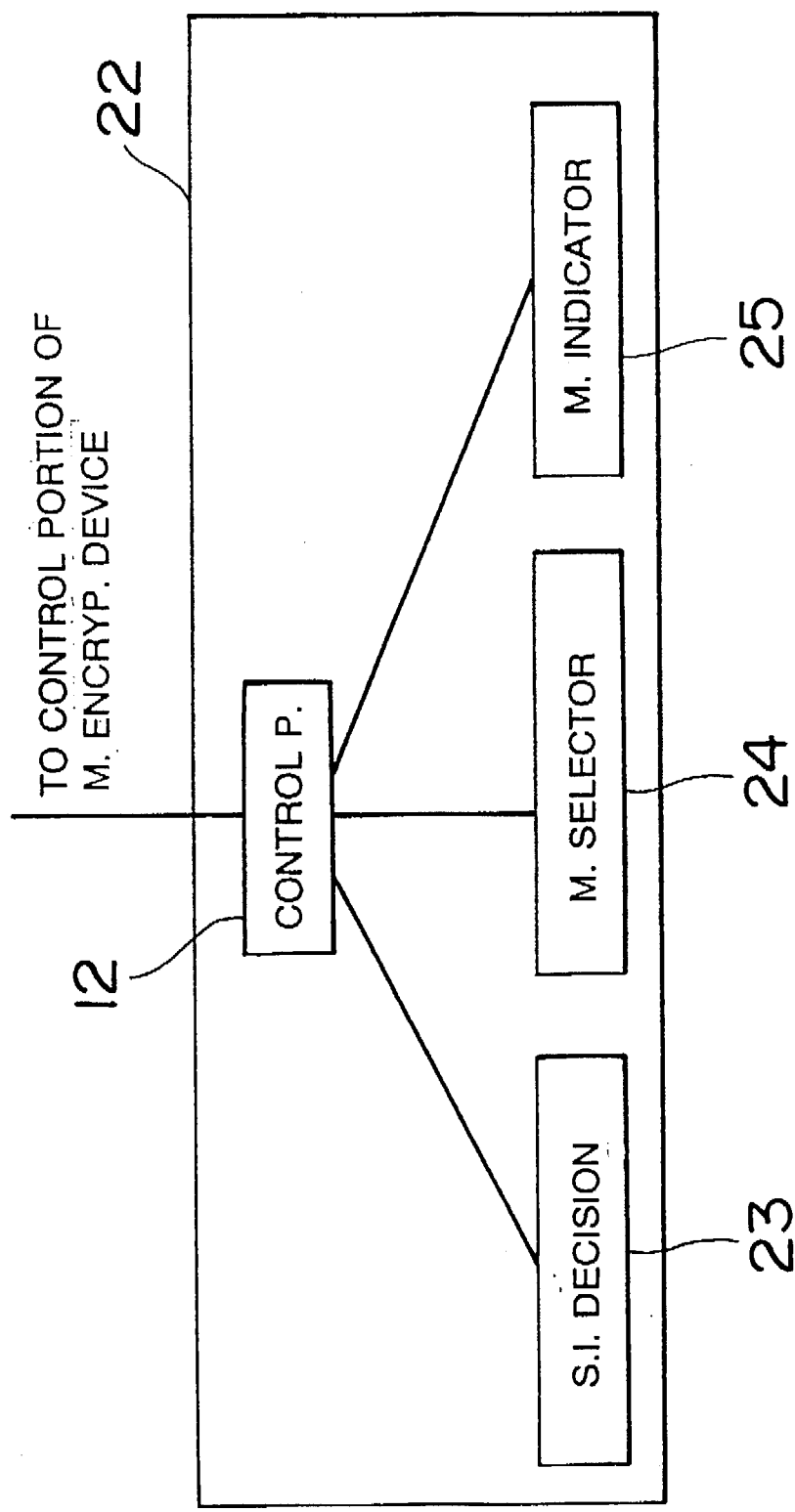
FIG. 8 is a block diagram of a multiaddress decision portion included in Example 4 of the invention.

The multiaddress decision portion 22 is particularly shown in FIG. 8. In this figure, the decision portion 22 comprises a sender information decision portion 23, a multiaddress selector portion 24, and a multiaddress indicator portion 25. The sender information decision portion 23 judges the mode in which information was sent by the sender. Information sent from a sending subscriber terminal to the cryptoinformation repeater 21 can take the following two modes.

(1) (i) Information, and (ii) a digital signature created, using the secret key for the sender.

(2) (i) Cryptoinformation Obtained by encrypting information with a public key common to all the subscribers, and (ii) a signature created with the secret key for the sender.

In the mode (1) above, information is sent in the form of plaintext. In the mode (2), information is sent in cipher.

The multiaddress selector portion 24 serves to select the mode in which information is sent from the cryptoinformation repeater 21 to each receiving subscriber terminal. This mode can take the following four modes.

(3) (i) Information, and (ii) a signature created with a secret key common to all the subscribers.

(4) (i) Cryptoinformation obtained by encrypting information with public keys for the subscribers, respectively, and (ii) a digital signature created with a secret key common to all the subscribers, (5) (i) Information to which the result of verification of a digital signature attached to information sent from a sender is appended, and (ii) a digital signature created with a secret key common to all the subscribers.

(6) (i) Information created by encrypting the information (i) of (5) with public keys for the subscribers, respectively, and (ii) a digital signature created with a secret key common to all the subscribers.

The multiaddress selector portion 24 can select 8 different modes from combinations of (1) and (3)–(6) and from combinations of (2) and (3)–(6).

When the multiaddress selector portion 24 selects any mode, the required level of confidentiality may be selected according to the state of the system. For example, if a combination of the modes (1) and (3) is selected, a digital signature is attached to plaintext as described in Example 3. Where top secret is needed, a combination of the modes (2) and (6) is selected. In this combination of the modes (2) and (6), cryptographic information and a digital signature are transmitted. The result of check made on the digital signature by the cryptoinformation repeater 21 is also sent to the receiving subscriber terminal. This can assure the recipient of a higher level of confidentiality.

In the description of the various examples of the invention, public keys and secret keys for subscribers are registered in the key storage portions of the subscriber terminals. It is to be understood that the key'storage portions of the terminals are not limited to stationary memories. For instance, each subscriber may register a common public key, its own public key, and its own secret key in a recording medium such as an IC card. The subscriber carries the card. If necessary, the subscriber inserts the card into the IC card slot in a nearby general-purpose terminal. In this way, a terminal peculiar to this subscriber is realized.

Furthermore, in the above examples, PEM is used as a cryptoinformation communication method. Of course, any other communication method may also be used. In addition, the cryptographic algorithm is not limited to the RSA algorithm.

What is claimed is:

1. A cryptoinformation repeater for transmitting information among a plurality of subscribers interconnected by a communication line, said cryptoinformation repeater comprising:

a cryptographic computational means for decrypting, using a secret key of the cryptoinformation repeater, cryptographic information, encrypted based on a public key for said cryptoinformation repeater, received from one of said subscribers acting as a sender and for encrypting information, based on a public key of a subscriber acting as a receiver, prior to the information being transmitted to said subscribers acting as a receiver; and a key storage means in which a common secret key for decrypting said cryptographic information and public keys for encrypting information to be transmitted to said subscribers, respectively, are stored.

2. The cryptoinformation repeater of claim 1, wherein each subscriber uses a terminal, further comprising:

a subscriber decision means for checking a digital signature created with a secret key intrinsic to a terminal of a subscriber acting as a sender when information to which said digital signature is attached is received from a terminal of a subscriber acting as a sender.

3. The cryptoinformation repeater of claim 1, further comprising a multiaddress decision means for changing a degree of confidentiality of the information according to an indication received from one of the subscribers acting as a sender.

4. The cryptoinformation repeater of claim 1, further comprising:

a subscriber terminal having a key storage means for storing a common public key for encrypting information sent from the subscriber terminal to the cryptoinformation repeater regardless of the eventual destination of the information and a secret, private key for decrypting information received by the subscriber terminal from the cryptoinformation repeater.

5. A method of transmitting from a sending subscriber to receiving subscribers, cryptographic information encrypted with a public key common to all subscribers, said method comprising the steps of:

sending the cryptographic information to a central location;

decrypting, at the central location, said encrypted information with a secret key common to all the subscribers;

encrypting, at the central location, said information for each receiving subscriber with a public key for the receiving subscriber; and sending the encrypted information to each of the receiving subscribers.

6. A method of transmitting cryptographic information as set forth in claim 5, wherein a digital signature created with a secret key for the sending subscriber is appended to said information.

7. A method of transmitting cryptographic information as set forth in claim 6, wherein when encrypted information to which a digital signature created with the secret key is appended is received by a receiving subscriber, the digital signature is checked with the public key for the sending subscriber possessed by the receiving subscriber to determine whether said sending subscriber is an authorized subscriber.

8. A method of transmitting cryptographic information as set forth in claim 7, wherein a result of the determination is attached to information received from the sending subscriber and sent to each receiving subscriber.

9. A method of transmitting cryptographic information as set forth in claim 5, wherein information is encrypted with a different public key for each individual subscriber and sent to corresponding receiving subscribers, and a digital signature is created with said secret key common to all the subscribers and appended to said information.

10. A method of transmitting cryptographic information as set forth in claim 5, further comprising:

creating a digital signature for the sending subscriber with a secret key possessed by the sending subscriber, appending the digital signature to the information, and sending the information to a cryptographic information repeater, when the cryptographic information repeater received said information, checking authenticity of the digital signature with a public key for the sending subscriber, the public key being possessed by the repeater, creating a second digital signature with the secret key common to all the subscribers, appending the second digital signature to the information, and sending the information to each subscriber, and receiving the information for each subscriber and checking the authenticity of the second digital signature with said public key common to all the subscribers and possessed by each subscriber.

11. A cryptoinformation repeater for transmitting and receiving cryptoinformation among a plurality of subscribers, each subscriber connected, via a communication line, to the cryptoinformation repeater, the cryptoinformation repeater comprising:

secret key storage means for storing a secret key specific to said repeater, said secret key used to decrypt cryptoinformation sent from a subscriber and encrypted based on a public key for said repeater;

public key storage means for storing a plurality of public keys corresponding to a plurality of subscribers; and cryptoinformation computing means for decrypting the cryptoinformation sent from a subscriber based upon the secret key read from said secret storage means and to identify a desired reading subscriber from said decrypted cryptoinformation, and also for reading a public key corresponding to said desired receiving subscriber from said public key storage means and to encrypt the decrypted cryptoinformation sent form a subscriber based upon the read public key corresponding to said desired receiving subscriber.

* * * * *